Sept. 30, 1924.
E. F. EVANS
1,510,048
WHEEL GUARD
Filed Feb. 14, 1924
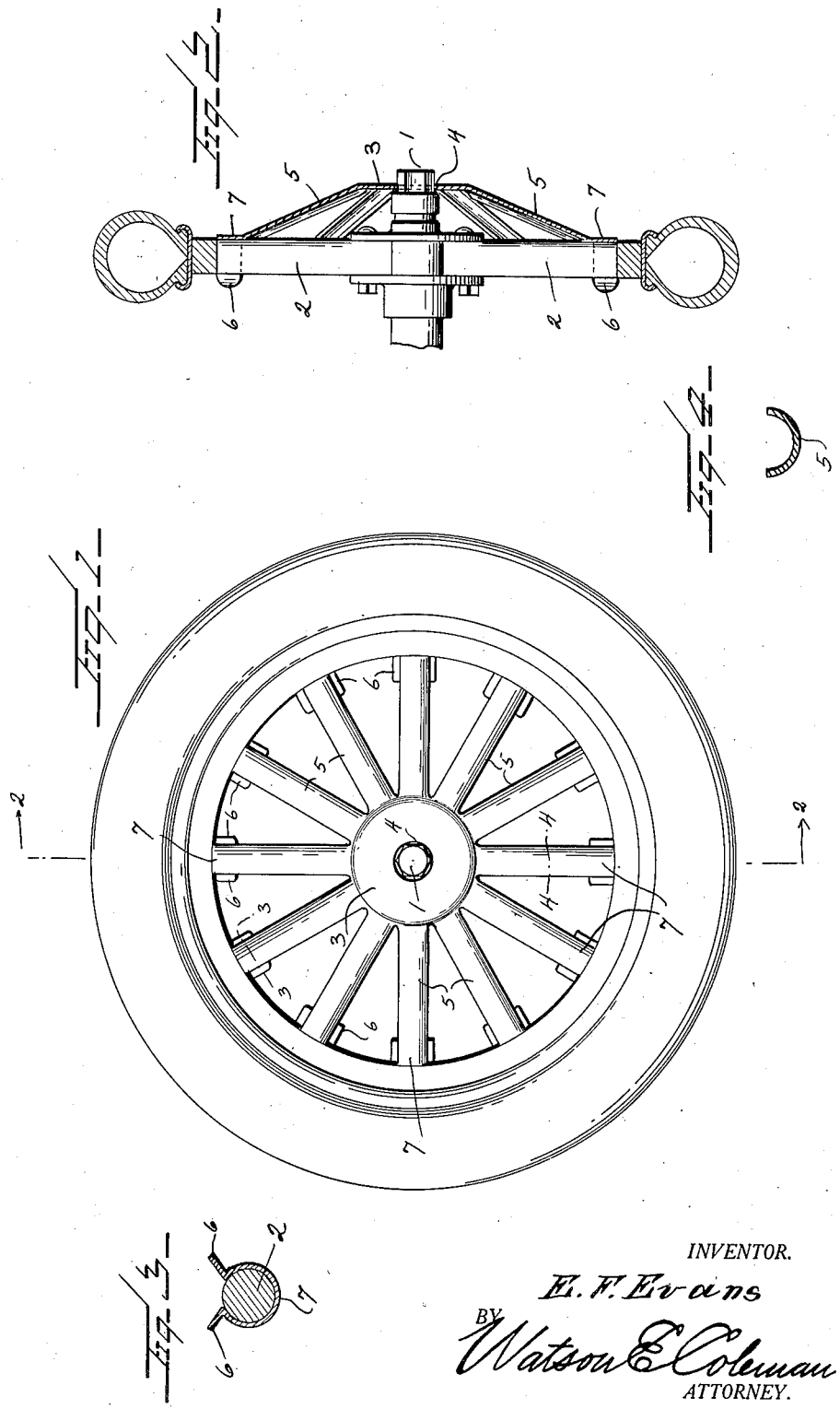
INVENTOR.
E. F. Evans
BY Watson E. Coleman
ATTORNEY.

Patented Sept. 30, 1924.

1,510,048

UNITED STATES PATENT OFFICE.

ELISHA FRANKLIN EVANS, OF HOMERVILLE, GEORGIA.

WHEEL GUARD.

Application filed February 14, 1924. Serial No. 692,901.

*To all whom it may concern:*

Be it known that I, ELISHA FRANKLIN EVANS, a citizen of the United States, residing at Homerville, in the county of Clinch and State of Georgia, have invented certain new and useful Improvements in Wheel Guards, of which the following is a specification, reference being had to the accompanying drawings.

This invention relates to an improved wheel guard for use in connection with vehicle wheels and principally in connection with the wheels of automobiles to protect the spokes and prevent them from being struck and broken, and also to brace the spokes and prevent them from being readily broken if the automobile should skid and the wheel strike a curb.

Another object of the invention is to provide a wheel guard which may be readily put in place and fit about the hub cap and have arms securely but releasably clamped to the spokes of the wheel, thereby permitting the guard to be used as an accessory and easily put in place.

Another object of the invention is to so construct this guard that it may be formed from a single blank of strong sheet metal such as steel.

Another object of the invention is to so construct this guard that when in use it will be attractive in appearance and be an ornament to the automobile instead of being unsightly.

This invention is illustrated in the accompanying drawings, wherein:—

Figure 1 is a side elevation of a wheel provided with the improved guard.

Figure 2 is a sectional view taken along line 2—2 of Figure 1.

Figure 3 is a sectional view through one of the spokes taken along line 3—3 of Figure 1.

Figure 4 is a sectional view through one of the arms of the guard.

This improved wheel guard is for use in connection with an automobile wheel and will fit about the hub cap 1 and have arms engaged with the spokes 2 of the wheel. This device is stamped from heavy sheet metal such as steel and is provided with a central portion 3 which has a diameter of approximately the diameter of the hub of the wheel. In the center of the central portion 3 there has been provided an opening 4 which will be preferably circular in shape so that it can fit about hub caps of different shapes. The arms 5 extend in radiating relation to the central portion 3 of the guard and are curved transversely to give added strength to the arms and also provide outer curved faces so that in case the arms are struck by another automobile colliding with the automobile provided with the protectors, these arms will only receive a glancing blow and, therefore, will not be readily broken or bent out of shape. It should be further noted that the arms extend from the central portion 3 of the guard at such an angle that when in place with the hub cap extending through the opening 4 the arms will extend towards the spokes of the wheel in converging relation to the outer ends of the spokes. At their outer ends the arms are bent to fit in flat engagement with the spokes of the wheel and are provided with side wings 6. These side wings 6 are bent to extend upon opposite sides of the spokes and, together with the flattened end portions of the arms 5, form clamps 7 which will tightly grip the outer end portions of the spokes and firmly hold the guard in place upon the wheel. The metal from which the guard is formed will have sufficient resiliency to permit these clamps to be snapped into place about the spokes. It will therefore be seen that the guard may be easily put in place and will be firmly held in place upon the wheel but may be easily removed when it is desired to clean the wheels or transfer the guards from the wheels of one automobile to another.

What is claimed is:—

1. The combination with a vehicle wheel including a hub having a cap and spokes extending from the hub, of a guard including a central portion having a centrally located opening for receiving the hub cap of the wheel, arms extending from the central portion of the guard in radiating relation and extending at an incline for engagement with the outer end portions of the spokes of the wheel, said arms being curved transversely and having their outer free end portions in flat engagement with the spokes of the wheel and provided with side wings extending upon opposite sides of the spokes and, together with the outer end portions of the arms, constituting arms snapped into straddling relation to the outer end portions of the spokes and releasably holding the guard in connection with the wheel.

2. A vehicle wheel guard formed of resilient sheet metal and comprising a central portion having a centrally disposed opening formed therein, and arms extending from the central portion, said arms being disposed in radiating relation to the central portion and at an incline to the plane of the central portion and having their free ends provided with side wings bent to provide spoke engaging clamps, the arms between the central portion of the guard and the side wings being curved transversely.

3. A wheel guard comprising a central hub engaging portion and arms extending from the hub engaging portion in radiating relation to the same and each curved transversely from the hub engaging portion to a point adjacent its outer end, the outer end portions of the arms being provided with side wings and the side wings and outer end portions of the arms being bent to provide spoks engaging clamps.

4. A wheel guard comprising a central hub engaging portion, arms extending from the hub engaging portion in radiating relation thereof, the outer end portions of the arms being provided with means for clamping engagement with the spokes of the wheel having the guard connected therewith.

In testimony whereof I hereunto affix my signature.

ELISHA FRANKLIN EVANS.